2,900,350

BREAKING WATER-IN-OIL EMULSIONS

Willard H. Kirkpatrick, Sugar Land, Tex., assignor to Visco Products Company, Houston, Tex., a corporation of Delaware No Drawing. Application February 27, 1956
Serial No. 567,728

10 Claims. (Cl. 252—331)

This invention relates in particular to the treatment of emulsions of mineral oil and water, such as petroleum emulsions commonly encountered in the production, handling and refining of crude mineral oil, for the purpose of separating the oil from the water. Also, the invention relates to the treatment of other water-in-oil types of emulsions wherein the emulsions are produced artificially or naturally and the resolution of the emulsions presents a problem of recovery or disposal.

The present application is a continuation-in-part of my copending application Serial No. 98,162 filed June 9, 1949, now abandoned, and a copending application Serial No. 250,013, filed October 5, 1951, now abandoned.

Petroleum emulsions are in general of the water-in-oil type wherein the oil acts as a continuous phase for the dispersal of finely divided particles of naturally occurring waters or brines. These emulsions are often extremely stable and will not resolve on long standing. It is to be understood that water-in-oil emulsions may occur artificially resulting from any one or more of numerous operations encountered in various industries. The emulsions obtained from producing wells and from the bottom of crude oil storage tanks are commonly referred to as "cut oil," "emulsified oil," "bottom settlings," and "B.S."

One type of process involves subjecting an emulsion of the water-in-oil type to the action of a demulsifying agent of the kind hereinafter described, thereby causing the emulsion to resolve and stratify into its component parts of oil and water or brine after the emulsion has been allowed to stand in a relatively quiescent state.

Still another type of process involves the use of a demulsifying agent of the kind hereinafter described in refinery desalting operations. In the refining of many crude oils a desalting operation is necessary in order to prevent the accumulation of large deposits of salt in the stills and to prevent corrosion resulting from the decomposition of such salts under high still temperatures. In a typical desalting installation 5% to 10% of fresh water is added to the crude oil charge stock and emulsified therein by means of a pump or through a differential pressure valve. A demulsifying agent is added and the treated oil permitted to stand in a quiescent state for relatively short periods of time allowing the salt-laden water to stratify, whereupon it is bled off to waste resulting in 90% to 98% removal of salt content. This operation is carried out continuously as contrasted with batch treating.

One object of the invention is to provide a novel and economical process for resolving emulsions of the character referred to into their component parts of oil and water or brine.

Another object is to provide a novel reagent which is water-wettable, interfacial and surface-active in order to enable its use as a demulsifier or for such uses where surface-active characteristics are necessary or desirable.

The treating agents employed in accordance with this invention can be described as an addition product (or condensation product with the elimination of water) of a compound from the group consisting of aldehydes and ketones and an aliphatic hydroxy compound containing a primary hydroxyl group, said addition product being further characterized by having a structure containing at least one interiorly located oxymethylene group to which is linearly attached at least one larger polyoxyalkylene chain and at least one aliphatic chain from the group consisting of aliphatic hydrocarbon chains, aliphatic oxyhydrocarbon chains, N-hydrocarbon chains and mixtures of these chains in the same molecule, with the further proviso that the average molecular weight attributable to oxyalkylene groups in said addition product is at least 1000 and the combined weight of oxyalkylene groups from the class consisting of oxymethylene and oxyethylene does not exceed the combined weight of the remainder of the molecule by a weight ratio greater than 4:1. Usually the addition products employed for the purpose of the invention have an average molecular weight not exceeding 20,000 but it is possible in some cases for the molecular weight to be much higher, for example, up to 180,000.

If said addition product is prepared by the addition of a diol to formaldehyde the resultant addition product can be called a formal and the terminal groups of the linear chain will be hydroxy groups. On the other hand, if a monoether of a diol is reacted with formaldehyde, the terminal groups of the resultant formal will be ether groups. If a formal diol is esterified one or both terminal groups will be ester groups. If a dicarboxy acid is used in the esterification the terminal groups can be carboxy groups. If such terminal carboxy groups are neutralized the terminal groups are carboxy salt groups. If an amine salt is used in the neutralization and the product is heated to amide forming temperatures the terminal groups are carboxy amide groups.

Where the oxymethylene groups and the groups derived from the hydroxy compound linked thereto do not recur in the linear chain the resultant addition product can be described as monomeric. Where the oxymethylene groups and the groups derived from the hydroxy compound linked thereto recur in the linear chain the resultant addition product is polymeric. In order for a monomeric addition product to be suitable for the practice of the invention the initial oxyalkylene-containing hydroxy compound must have a relatively high molecular weight. Polymeric addition products suitable for the practice of the invention are readily prepared, for example, by reacting a polyoxyalkylene diol such as a polyoxypropylene glycol having a molecular weight of at least 400 with formaldehyde until the total molecular weight of the oxyalkylene groups exceeds 1000. It will be understood that the addition products employed in the practice of the invention can be cogeneric mixtures.

For the purpose of the invention where the composition employed is a polyoxyalkylene diol (or an ester, ether, or amine addition product thereof) having at least one interiorly located oxymethylene group and the remainder of the oxyalkylene groups are higher oxyalkylene groups, it is preferable that the combined weight of the hydrophilic oxyalkylene groups, namely, oxymethylene, and oxyethylene, does not exceed the weight of higher oxyalkylene groups by a weight ratio greater than 4:1. The weight ratio of such hydrophilic groups to such higher oxyalkylene groups is preferably within the range of 4:1 to 1:9.

The addition products preferably employed in the practice of this invention may be represented by the structural formula $$HO[(C_nH_{2n}O)_xOCE_2O]y(C_nH_{2n}O)_zH$$

wherein E is hydrogen or an alkyl or aryl radical, $n$ is an integer equal to 2 or more, and may have several values in the same compound, and $x$ and $y$ are one or more. Where $x$ and $y$ are 2 or more the products are polymers. Such compounds are thus seen to include polyoxyalkylene diols, in the polyoxyalkylene chain of which appears at least one oxymethylene (or substituted oxymethylene) group, and in which there are also other (larger) oxyalkylene groups. By these "larger" oxyalkylene groups is meant oxyalkylene groups which are not oxymethylene or substituted oxymethylene groups. Examples of these large oxyalkylene groups are oxyethylene ($-OCH_2CH_2-$), oxypropylene ($-OCH_2CH-$  and $-OCH_2CH_2CH_2-$)

oxybutylene 

and oxyalkylenes of greater number of carbons such as oxypentamethylene, oxyhexamethylene, oxydecamethylene and higher homologues. The larger oxyalkylene groups present in the polyoxyalkylene chain may all be the same, or they may be different, so that several are present in the same chain. When the larger oxyalkylene groups are not all the same, they may occur in the chain in various proportions and in a regular or irregular sequence, with respect to each other. The term "mixture" is used herein generically to cover both a regular and an irregular sequence.

To illustrate the different types of end products contemplated for use in the practice of the invention there may be mentioned:

(a) Condensation products of aldehydes and ketones either simultaneously or successively with two types of polyhydric alcohols, viz., (1) those in which primary hydroxyl groups are connected by a hydrocarbon chain and (2) those in which primary hydroxyl groups are connected by an oxyalkylene chain, e.g., condensation products of: formaldehyde with pentane diol 1,5 and polyethylene glycol 600, or polyoxypropylene glycol 2000, or polyoxyethylated polyoxypropylene glycol 35–4 (4 moles of ethylene oxide added to a polyoxypropylene glycol derived from 35 moles of 1,2-propylene oxide);

(b) Condensation products of aldehydes and ketones with polyoxyalkylene glycols, e.g., condensation products of: formaldehyde with diethylene glycol; formaldehyde with triethylene glycol; formaldehyde with nonaethylene glycol; formaldehyde with Polyethylene Glycols 200, 300, 400 and/or 600; formaldehyde with Polyglycols P–400, P–750, and/or P–1200; formaldehyde with Carbowax 1000, 1500 and/or 1540; formaldehyde with mixtures of polyoxyethylene glycols (e.g., Polyethylene Glycols 200, 300, 400 and 600, Carbowax 1000, 1500 and 1540) and polyoxypropylene glycols (e.g., those having average molecular weights of 400, 750, 1200, 2000 and 2800); formaldehyde with Ucon 10 HDG 373, Ucon 10 HDG 506, Ucon 10 HDG 700, Ucon 10 HDG 1682, Ucon 25 HDG 510, Ucon 25 HDG 876, Ucon 25 HDG 1156; Ucon 25 HDG 2157; Ucon 40 HDG 499; Ucon 40 HDG 1026; Ucon 40 HDG 1703; Ucon 40 HDG 2412; Ucon 75 H 1400; Ucon 75 H 4900; Ucon 75 H 9150 and/or Ucon 75 H 90,000;

(c) Condensation products of aldehydes and ketones with ether alcohols having a terminal hydroxy group and a terminal ether group and an average molecular weight of at least 500, e.g., condensation products of: formaldehyde and the cetyl ether of nonaoxyethylene glycol; formaldehyde and the dodecyl ether of nonaoxyethylene glycol; formaldehyde and the cetyl ether of a polyoxypropylene glycol having an average molecular weight of 1200; formaldehyde and the monophenyl ether of a polyoxypropylene glycol having an average molecular weight of 1200; formaldehyde and the cyclohexylether of a polyoxypropylene glycol having an average molecular weight of 1200; formaldehyde and the monobenzyl ether of a polyoxypropylene glycol having a molecular weight of 1200; formaldehyde and Ucon 50 HB 660; formaldehyde and Ucon 50 HB 3520; formaldehyde and 50 HB 5100; formaldehyde and Ucon LB–1145; formaldehyde and Ucon 50 HTD 761; formaldehyde and Ucon 50 HTD 1294; formaldehyde and Ucon 50 HM 1277; formaldehyde and Ucon 50 HM 691; formaldehyde and Ucon 60 HB 5100;

(d) Condensation products of aldehydes (e.g., formaldehyde) and ketones (e.g., acetone) with mixtures of aliphatic hydroxy compound initial reactants as disclosed under (a), (b) or (c), supra, and aliphatic monohydric alcohols, e.g., methanol, ethanol, isopropanol, butanol, cyclohexanol, 2-ethyl hexanol, dodecyl alcohol, tetradecyl alcohol, hexadecyl alcohol, octadecyl alcohol and/or myricyl alcohol;

(e) Condensation products of aldehydes and ketones with amino alcohols derived by the condensation or primary and/or secondary monoamines and alkylene oxides from the group consisting of ethylene oxide, 1,2-propylene oxide and mixtures of ethylene oxide and 1,2-propylene oxide, for example, condensation products of: formaldehyde and 50 HBA 607; formaldehyde and 50 HBA 1613; formaldehyde and 50 HBA 1776; formaldehyde and 50 HBA 2098; formaldehyde and 50 HDBA 588; formaldehyde and 50 HDBA 1373; formaldehyde and 50 HDBA 2855; formaldehyde and condensation products of ethylene oxide and/or 1,2-propylene oxide with amylamine, diamylamine, ethylamine, diethylamine, cyclohexylamine, dicyclohexylamine, benzylamine, dibenzylamine, aniline and diphenyl amine;

(f) Condensation products of aldehydes and ketones with amino alcohols having at least two terminal hydroxy groups derived by the condensation or primary and/or secondary polyamines with an alkylene oxide from the group consisting of ethylene oxide, 1,2-propylene oxide, and mixtures of 1,2-propylene oxide and ethylene oxide, there being preferably 1 to 9 parts of 1,2-propylene oxide per part of ethylene oxide, e.g., the condensation product of formaldehyde with a condensation product of a polyamine such as ethylene diamine, diethylene triamine, triethylene tetramine, tetraethylene pentamine, dipropylene triamine, tripropylene tetramine, meta phenylene diamine, benzidine, or naphthylene diamines and ethylene oxide, and/or 1,2-propylene oxide;

(g) The mono- and diesters obtained by esterifying any of the condensation products under (a), (b), (e) and (f) with polycarboxy organic acids, e.g., terephthalic, glycollic, phthalic, maleic, adipic, dilinoleic acids, succinic, itaconic and homologous acids and anhydrides thereof, the monoester being formed when the end product contains a free carboxy group;

(h) The alkali metal, ammonium, and amino salts of the monoesters under (g) (e.g., of the primary and secondary amines listed under (e) and (f));

(i) The amides of the carboxylic monoesters of (g) derived by a reaction involving the elimination of water between the hydroxy portion of a carboxy group of one of said monoesters and a hydrogen atom of a primary and/or secondary amino group of an amine, e.g., any of the primary and second amines listed under (e) and (f).

The structures of the foregoing compounds will be characterized by one or more oxymethylene groups connected linearly to a plurality of (a) aliphatic hydrocarbon groups and having terminal hydroxy groups; (b) aliphatic oxyhydrocarbon (ether) groups and having terminal hydroxy groups; (c) and (d) aliphatic hydrocarbon or oxyhydrocarbon groups and having terminal ether groups; (e) aliphatic oxyhydrocarbon groups and having terminal secondary or tertiary amino groups; (f) aliphatic N-hydrocarbon (nitrogen atoms linearly connected by carbon atoms) and oxyhydrocarbon groups linearly connected and having terminal hydroxy groups; (g) aliphatic hydrocarbon, oxyhydrocarbon and/or N-hydrocarbon groups having terminal hydroxy groups esterified with polycarboxy acids (either partially or completely esterified); (h) aliphatic hydrocarbon, oxyhydrocarbon and/or N-hydrocarbon groups having terminal carboxy salt groups; and (i) aliphatic hydrocarbon, oxyhydrocarbon and/or N-hydrocarbon groups having terminal carboxy amide groups. The preferred treating agents contain at least one oxymethylene group linearly attached to oxyhydrocarbon chains wherein the oxyhydrocarbon groups are oxyethylene and oxy-1,2-propylene and the weight ratio of oxyethylene to oxy-1,2-propylene in the molecule is within the range of 3:1 to 1:9.

If the initial hydroxy reactant is a polyhydric alcohol, it is esential that the hydroxy groups therein be spaced by at least five atoms because if the hydroxy groups are too close to each other there is a tendency toward the formation of ring compounds by reaction between the hydroxy groups and the aldehydes or the ketones.

The oxymethylene group in the addition product is supplied by the aldehyde or ketone reactant. If formaldehyde is used, the oxymethylene group will be unsubstituted. If a higher aldehyde is employed, the oxymethylene group will be substituted, depending upon the aldehyde used. Thus, if acetaldehyde is employed, the substituent will be a methyl group. If acetone is used in making the addition product the oxymethylene group contains two methyl substituents. If a higher aldehyde, for example, butyraldehyde, is employed, the substituent group on the oxymethylene group will be a propyl group. If the aldehyde reactant is benzaldehyde, the substituent on the oxymethylene group will be a phenyl group. In a similar manner, homologous aldehydes and ketones produce addition products with different substituents on the oxymethylene group.

Formaldehyde either in an aqueous solution called formalin or as solid trioxane is preferably employed as one of the initial reactants because it forms compounds of high molecular weight when reacted with low molecular weight aliphatic polyhydric alcohols. Other aldehydes and ketones do not react so readily and usually only form a dimer of the aliphatic alcohol. These other aldehydes and ketones can be used provided the aliphatic alcohol compound itself has a rather high molecular weight so that the resultant product will have the necessary high molecular weight.

The preferred reactants used to form the addition products are formaldehyde and polyoxyalkylene glycols containing 2 to 5 carbon atoms in their oxyalkylene groups. The oxyethylene group is relatively hydrophilic and hence where the polyoxyalkylene glycol reacted with the formaldehyde contains all oxyethylene groups relatively high molecular weights must be attained in order to secure the best results in breaking water-in-oil emulsions. Higher oxyalkylene groups such as those derived from 1,2-propylene groups are more hydrophobic and where these groups are present as the sole oxyalkylene groups in the polyoxyalkylene glycol, the optimum results can be obtained with products having a substantially lower molecular weight. Excellent results are obtained by using as one of the reactants an aliphatic ether alcohol characterized by a polyoxyalkylene group having different terminal groups connected to different carbon atoms, one of said terminal groups being a hydroxy group and the other being either a hydroxy group or an ether group, and the oxyalkylene groups being either oxy-1,2-propylene groups, or oxyethylene and oxy-1,2-propylene groups derived from at least ⅓ part of 1,2-propylene oxide for each part of ethylene oxide by weight.

The reaction between the aldehyde and the ketone, on the one hand, and the aliphatic hydroxy compound on the other, is carried out in the presence of a suitable catalyst either under dehydrating conditions or, alternatively, the aliphatic hydroxy compound can first be reacted with the aldehyde or ketone and then the water formed in the reaction can be removed from the reaction zone. In the following discussion the proportion of the addition products will be illustrated by the employment of formaldehyde as one of the reactants and a polyoxyalkylene glycol as the other, but it will be understood that the same reaction conditions are applicable to the employment of other aldehydes or ketones, on the one hand, and other aliphatic hydroxy compounds, on the other hand.

It will be understood that while in discussing these reactions reference is made to the use of formaldehyde, the formaldehyde may be supplied and preferably is employed in the form of a compound which liberates formaldehyde in situ in an anhydrous form. A preferred compound for this purpose is trioxane which when heated in a substantially anhydrous system in the presence of strong acids such as sulfuric, hydrochloric and phosphoric acids or acidic materials such as zinc chloride, ferric chloride or the like, is readily depolymerized to monomeric formaldehyde. The formaldehyde produced in this way is extremely reactive and enters readily into combination when the depolymerization is carried out in the presence of the hydroxy compound capable of reacting with the formaldehyde. (See Walker, "Formaldehyde," second edition, Monograph Series 120, Rheinhold Publishing Corporation, 1953, pages 152, 153.) Other polyoxymethylene compounds capable of depolymerizing to formaldehyde under the reaction conditions can be employed as a source of formaldehyde. Paraformaldehyde may also be used as a source of formaldehyde. The use of aqueous formaldehyde is usually undesirable because the condensation reaction itself involves the elimination of water and the use of a material initially containing water requires the elimination of additional quantities of water.

The reaction between the glycol and the formaldehyde is preferably carried out at moderate temperatures, for example, between 50° C. and 135° C., with or without a solvent as a diluent. To accelerate the reaction Friedel-Crafts catalysts are preferably employed, for example, aluminum chloride, ferric chloride, titanium tetrachloride, stannic chloride, borontrifluoride, and acid compounds such as sulfuric acid, benzene sulfonic acid or acid cation exchangers containing strongly acidic groups such as the sulfonated polymer of styrene and divinylbenzene, sulfonated phenol-formaldehyde resin, sulfonated coal or the like.

The reaction is preferably carried out under very strong dehydrating conditions facilitating the removal of water from the reaction mixture. In the practice of the invention two different methods have been employed effectively. In one case aromatic hydrocarbons, such as benzene, toluene or xylene, which form azeotropes with water were distilled from the reaction zone. The water formed in the reaction was thus continuously eliminated and very strong dehydrating conditions existed. In the second method the water was removed under vacuum using a slow stream of dry air to give the strong dehydrating conditions necessary. Other methods of preparation in which very strong dehydration conditions exist are also suitable for the preparation of the compounds of this invention.

In order to separate and collect the water formed in the reaction it is convenient to carry out the reaction in benzene solution. The benzene is distilled slowly and the water distilling with the benzene is separated. The benzene is then returned to the reaction zone.. The water collected is measured and the progress of the reaction can be followed in this way. A convenient apparatus for carrying out this reaction consists of a Dean-Stark moisture trap fitted with a reflux condenser and a round bottom boiling flask. A tube full of a desiccant, such as calcium chloride, is preferably attached to the open end of the reflux condenser to prevent the condensation of the moisture from the atmosphere.

By way of illustrating the effectiveness of the products contemplated by this invention the method of testing their efficiency in bottle tests will be described and examplary date given.

Example I

Field bottle tests were made on samples of emulsified oil taken from the Dominguez Hills field in California. A sample grind-out showed that these emulsions contained about 41 parts of water per 100 parts of emulsion. A wash tank system was being used in this field.

One hundred (100) cc. samples were taken and placed in conventional field test bottles. A finding ratio test indicated a treating ratio of 0.09 cc. of a 10% solution of the treating chemical was required for 100 cc. of sample.

Every effort was made to maintain conditions comparable to those present in a full scale plant treatment.

The test chemical was added to the samples in the test bottles and each bottle was agitated by shaking it 200 times at 90° F. The compositions in the test bottles were then allowed to settle and were tested for water drop at predetermined periods of time.

After the first agitation each sample was shaken an additional 100 times at a temperature of 90° F. After agitation at said temperatures the samples were allowed to stand to permit settling and stratification of the water and again tested for water drop.

A condensation product of pentane diol-1,5, polyethylene glycol 600, and trioxane was tested in the manner described above. Twenty minutes after the bottles were shaken 200 times, 25 out of the 41 parts of water separated. The bottles were then shaken another 100 times and 60 minutes after the first agitation of the bottles 39 out of the 41 parts of water had separated. On standing approximately 12 hours all of the water had separated.

The composition used in this example was prepared as follows:

In a reaction vessel equipped with thermometer, stirrer and means for refluxing solvent with provisions for trapping any water which forms in the course of the reaction, there was mixed 104 parts pentane diol-1,5, 30 parts trioxane, 1 part ferric chloride and 150 parts of benzene. The reactants were heated together with agitation until the water of reaction started distilling over. At that point the source of heat was removed and 100 parts of polyethylene glycol 600 and 5 parts of trioxane were added. The heating was resumed and continued until a total of 21 parts of water had been secured. The temperature of this reaction varied between 81 and 92° C. with the water being secured in about 18 hours.

Example II

The procedure was the same as in Example I except that the sample bottles were shaken 200 times at atmospheric temperatures and then 100 times at 100° F. The treating ratio was 0.20 cc. of a 10% solution of the treating chemical per 100 cc. of sample. 20 minutes after the cold agitation a product made by reacting trioxane with polyethylene glycol 600 and polypropylene glycol 750 caused 25 out of the 41 parts of water to separate. Thereafter the samples were given hot agitation and 60 minutes later all of the water had separated.

The composition employed as a treating agent in this example was prepared as follows:

In equipment similar to that described in Example I, 100 parts of polyethylene glycol 600, 125 parts of polypropylene glycol 750, 10 parts of trioxane, 1 part of ferric chloride and 100 parts of benzene were heated together with agitation until a total of 8.4 parts of water formed in 4½ hours at a temperature between 92 and 98° C.

Example III

The procedure was the same as that described in Example I except that the emulsified oil was taken from a field at Signal Hill, California, using the flow line type of system. The test bottles were shaken 200 times at atmospheric temperatures and 100 times at a temperature of 130° F. The emulsified oil contained 42 parts of water per 100 cc. sample. The treating ratio was 0.15 cc. of a 10% solution of the treating agent. Thirty minutes after cold agitation the product described in Example II caused the separation of 36 parts of water. After hot agitation and 95 minutes from the beginning of the test 40 parts out of the 42 parts of water in the emulsion had separated.

In a similar manner this emulsion was treated with a composition made by condensing trioxane with polyethylene glycol 600 and polypropylene glycol 750. After cold agitation this composition caused the separation of 39 parts of water approximately 30 minutes from the beginning of the test. After hot agitation the same composition caused the separation of 40 parts of water approximately 95 minutes from the beginning of the test. Approximately 41 parts of water separated after 3¼ hours from the beginning of the test.

The last named composition was prepared as follows:

In equipment similar to that employed in Example I, 60 parts of polyethylene glycol 600, 150 parts of polypropylene glycol 750, 9 parts of trioxane, 1 part of ferric chloride and 100 parts of benzene were heated together with stirring until a total of 6.8 parts of water had been removed from the reaction. This required 6 hours at a temperature of 92 to 98° C.

Example IV

In equipment similar to that employed in Example I, 100 parts of polyethylene glycol 600, 200 parts of polypropylene glycol 1200, 10 parts of trioxane, 2 parts of ferric chloride, and 100 parts of benzene were heated until a total of 7.4 parts of water were secured from the reaction. This required 7½ hours at a temperature of 98 to 107° C.

This composition was tested in the same manner as described in Example III with essentially the same results as those described for the last named composition in Example III.

Example V

In equipment similar to that employed in Example I, 36 parts of polyethylene glycol 600, 180 parts of polypropylene glycol 750, 9 parts of trioxane and 1 part of ferric chloride and 100 parts of benzene were heated with stirring until a total of 6.7 parts of an aqueous distillate had been secured. This required 10 hours at a temperature of 95 to 102° C.

This composition was tested as described in Example III and caused the separation of 32 out of the 42 parts of water to occur in 30 minutes after the start of the test and before hot agitation. After hot agitation and 95 minutes from the start of the test 40 out of the 42 parts of water had separated.

Example VI

The procedure was the same as that described in Example I except that the emulsified oil was taken from a field at Signal Hill, California, using the flow line type of system. The samples were shaken 200 times at atmospheric temperatures and 100 times at a temperature of 130° F. The treating ratio was 0.08 cc. of a 10% solution of the treating agent per 100 cc. sample of emulsified oil.

The treating agent employed in this example was a condensation product of trioxane with polyethylene glycol 400 and polypropylene glycol 750. Before hot agitation this composition caused 40 parts out of the 42 parts of water to separate. The same amount separated after hot agitation and 85 minutes from the beginning of the test. The emulsion breaking properties of this composition were therefore outstanding.

The composition employed in this example was prepared as follows:

In equipment similar to that employed in Example I 40 parts of polyethylene glycol 400, 150 parts of polypropylene glycol 750, 9 parts of trioxane, 1 part of ferric chloride and 100 parts of benzene were heated with stirring until a total of 5.8 parts of water had been secured which required 6 hours at a temperature of 92 to 106° C. The reaction product was cooled and an additional 9 parts of trioxane and 50 parts of benzene were added and reheated to lose an additional 1.5 parts of aqueous distillate. This latter portion of the reaction required 8 hours at a temperature of 93 to 104° C.

Example VII

In equipment similar to that employed in Example I, 60 parts of polyethylene glycol 600, 150 parts of polypropylene glycol 750, 9 parts of trioxane, 1 part of ferric chloride, and 100 parts of benzene were heated with stirring until 6 parts of an aqueous distillate had been secured which required approximately 7 hours at a temperature of 93 to 113° C. The reaction product was cooled and an additional 9 parts of trioxane and 50 parts of benzene added. Heating was resumed until an additional 1.4 parts of aqueous distillate was secured. This phase of the reaction required approximately 4 hours at a temperature of 95 to 101° C.

The composition prepared as described above was tested as described in Example VI with essentially the same results. This composition was also outstanding.

Example VIII

The procedure was the same as that described in Example I except that the emulsified oil was taken from the Wilmington field, California. The temperature of hot agitation was 150° F. and the samples contained 22 cc. of water per 100 cc. of emulsion before hot agitation. A composition made by condensing trioxane with polyethylene glycol 400 and polypropylene glycol 2000 caused 16 out of the 22 parts of water to separate. After hot agitation and 3 hours from the start of the test 21 out of the 22 parts of water had separated.

The treating agent employed in this example was prepared as follows:

In equipment similar to that employed in Example I, 60 parts of polyethylene glycol 400, 152 parts of polypropylene glycol 2000, 7 parts of trioxymethylene, 1 part of ferric chloride and 150 parts of benzene were heated with stirring until a total of 4.6 parts of an aqueous distillate had been secured which required 6 hours at a temperature of 87 to 96° C. The intermediate reaction product was cooled and an additional 7 parts of trioxymethylene added and heating continued to secure an additional 1.8 parts of aqueous distillate. This second distillation required 5 hours at a temperature of 95 to 101° C.

Example IX

In equipment similar to that employed in Example I, 40 parts of polyethylene glycol 600, 164 parts of polypropylene glycol 1000, 7.2 parts of trioxane, 1 part ferric chloride and 150 parts benzene were heated with stirring until a total of 4.2 parts of water had distilled over. The reaction mass was cooled and an additional 7.2 parts of trioxane added. The mass was reheated until an additional 2.2 parts of aqueous distillate had been collected. This latter reaction required approximately 3 hours at a temperature of 86 to 88° C.

The procedure of testing was the same as described in Example VIII but the product was not as effective as that described in Example VIII.

Example X

In equipment similar to that employed in Example I, 60 parts of polyethylene glycol 600, 150 parts of polypropylene glycol 750, 9 parts of trioxane, 2 parts of ferric chloride and 150 parts of benzene were heated with stirring until a total of 6.2 parts of an aqueous distillate had been secured. The reaction mass was cooled to permit the addition of an additional 9 parts of trioxane. Heating was then gently resumed to secure an additional 1.3 parts of aqueous distillate.

This product was tested in the general manner described in the previous examples and found to be effective in breaking water-in-oil emulsions.

Example XI

In equipment similar to that employed in Example I, 150 parts of polypropylene glycol 750, 9 parts of trioxane, 3 parts of aluminum chloride, and 150 parts of benzene were heated together with stirring until 1.8 parts of aqueous distillate had been secured. This distillation required 2 hours at a temperature of 85 to 89° C. The reaction mass was cooled and 60 parts of polyethylene glycol 600 was added and the heating continued until 1.8 parts of water had been secured in 2½ hours between 90 and 92° C. The reaction mass was again cooled to permit the addition of 9 parts of trioxane. This required a reaction time of 7 hours at a temperature between 92 and 93° C.

This product was tested in the general manner described in the previous examples and found to be effective in breaking water-in-oil emulsions.

Example XII

In equipment similar to that employed in Example I, 100 parts of polyethylene glycol 600, 125 parts of polypropylene glycol 750, 15 parts of acetaldehyde, 1 part of ferric chloride and 100 parts of benzene were heated together with agitation until a total of 8.4 parts of water formed in 4½ hours at a temperature between 92 and 98° C.

This product was tested in the general manner described in the previous examples and found to be effective in breaking water-in-oil emulsions.

Example XIII

In equipment similar to that employed in Example I, 60 parts of polyethylene glycol 600, 150 parts of polypropylene glycol 750, 15 parts of acetaldehyde, 1 part ferric chloride, and 100 parts of benzene were heated with stirring until 6 parts of an aqueous distillate had been secured which required approximately 7 hours at a temperature of 93 to 113° C. The reaction product was cooled and an additional 15 parts of acetaldehyde and 50 parts of benzene added. Heating was resumed until an additional 1.4 parts of aqueous distillate was secured. This phase of the reaction required approximately 4 hours at a temperature of 95 to 101° C.

This product was tested in the general manner described in the previous examples and found to be effective in breaking water-in-oil emulsions.

Example XIV

In equipment similar to that employed in Example I, 320 parts of polyethylene glycol 400, 814 parts of polypropylene glycol 2000, 5 parts of ferric chloride, 36 parts of formaldehyde as an approximately 40% aqueous solution, and 400 parts of benzene were heated with stirring to obtain 23.5 parts of an aqueous distillate which was secured at a temperature of 93 to 101° C. in approximately 7 hours. The reaction mass was cooled to permit the addition of an additional 36 parts of formaldehyde as an approximately 40% aqueous solution and 5 parts of ferric chloride. The reaction mass was heated until 5.9 parts of an aqueous distillate formed at a temperature of 98° C. in a period of 1 hour.

This product was tested in the general manner described in the previous examples and found to be effective in breaking water-in-oil emulsions.

Example XV

The following ingredients were mixed in a 200 ml. 3-neck flask which was equipped with a continuous decanting device so that the water formed in the reaction could be removed:

| | |
|---|---|
| Polyglycol P-400 _____ gm__ | 20 |
| Trioxymethylene _____ gm__ | 1.5 |
| Aluminum chloride (anhydrous) _____ gm__ | .2 |
| Benzene _____ ml__ | 50 |

Heating was started with a small flame at 10:00 a.m. distillate containing water started to distill into the water separating chamber at about 11:30 a.m. Distillation was continued until .9 ml. (.05 mole) of water had been collected; about 2:30 to 3.00 p.m. one gram of anhydrous potassium acetate was added and the heating continued for an additional 15 minutes. The solution was filtered and the benzene was removed under vacuum. The product was a brown viscous liquid.

This product was tested in the general manner described in the previous examples and found to be effective in breaking water-in-oil emulsions.

Example XVI

In equipment similar to that employed in Example I, 850 parts of Ucon 50 HB 660, 65 parts of 2-ethylhexanol, 15 parts of trioxymethylene, 10 parts aluminum chloride and 200 parts of benzene were heated with stirring until 9.5 parts of water of reaction were obtained. This was secured in 3.5 hours at a temperature range of 85 to 104° C.

This product was tested in the general manner described in the previous examples and found to be effective in breaking water-in-oil emulsions.

Example XVII

In equipment similar to that employed in Example I, 104 parts of pentane diol-1,5, 44 parts of acetaldehyde, 3 parts of aluminum chloride and 150 parts of benzene were heated until water of reaction began to distill out. At that point the source of heat was removed and 100 parts of polyethylene glycol 600 and 5 parts of trioxane added. The heating was resumed until a total of 21 parts of an aqueous distillate had been secured at a temperature of 81 to 92° C. in about 18 hours.

This product was tested in the general manner described in the previous examples and found to be effective in breaking water-in-oil emulsions.

In the foregoing description the so-called "polyethylene glycols" followed by a number are the trade names for products made by Carbide and Carbon Chemicals Corporation having the general formula:

$$HOCH_2(CH_2OCH_2)_xCH_2OH$$

"Polyethylene glycols" 200, 300, 400 and 600 are all viscous light colored somewhat hygroscopic liquids of low vapor pressure having molecular weights from 200 to 700, thus "polyethylene glycol" 400 has an average molecular weight between 380 and 420 and is chiefly a mixture of nonaoxyethylene glycol $$[HO(CH_2CH_2O)_9H]$$

and octaoxyethylene glycol $$[HO(CH_2CH_2O)_8H]$$

The "Carbowax" compounds are polyoxyethylene glycols which are wax-like solids having a molecular weight about 1000. In the foregoing description the number following the name "Carbowax" indicates the approximate molecular weight except in the case of Carbowax 1500. Carbowax 1500 is a blend of equal parts of polyethylene glycol 300 and Carbowax 1540 and has an average molecular weight between 500 and 600.

The polyglycol P compounds are commercial polyoxypropylene glycols made by Dow Chemical Company. The number following the letter "P" signifies the average molecular weight of the glycols present in the mixture. For example, polyglycol P-400 consists mainly of a mixture of hexaoxypropylene glycol $$\left[ HO(CH_2\overset{CH_3}{\underset{|}{C}}HO)_6H \right]$$

and heptaoxypropylene glycol $$\left[ HO(CH_2\overset{CH_3}{\underset{|}{C}}HO)_7H \right]$$

The Ucon 75–H compounds are polyoxyalkylene glycols made by Carbide and Carbon Chemicals Corporation in which the oxyalkylene groups consist of oxyethylene and oxy-1,2-propylene groups in the same molecule. The compounds of this class designated 75–H contain a weight ratio of ethylene oxide to 1,2-propylene oxide of about 3:1. Among the mixed oxyethylene-oxypropylene glycols which may be reacted with substantially equal molecular proportions of formaldehyde in accordance with the invention are: Ucon 75 H 4900, Ucon 75 H 1400, Ucon 75 H 9150 and Ucon 75 H 90,000. Polyoxyalkylene glycols in which the oxyalkylene groups consisting of oxyethylene and 1,2-oxypropylene groups in an approximate weight ratio of 3:1, of 1:1, and of 1:9 are also suitable for reaction with an aldehyde in accordance with the invention. So far as the generic aspects of the invention are concerned the relative proportions of oxyethylene and oxypropylene groups in a given oxyalkylene glycol are not critical but it will be understood that different types of products are obtained depending upon the particular polyoxyalkylene glycol employed as a starting material.

The Ucon HDG compounds are high molecular weight glycols derived from diethylene glycol by the addition of ethylene oxide and 1,2-propylene oxide thereto. The number before the HDG indicates the percent of ethylene oxide, the remainder of the polyoxyalkylene groups being derived from 1,2-propylene oxide. The number following the HDG indicates the viscosity SUS at 100° F.

The Ucon HB compounds are addition products of ethylene oxide and 1,2-propylene oxide to butyl alcohol. The number ahead of the HB indicates the percentage of ethylene oxide, the remainder of the polyoxyalkylene groups being derived from 1,2-propylene oxide. Thus, Ucon 50 HB 660 contains ethylene oxide and 1,2-propylene oxide in a weight ratio of 1:1 and has a molecular weight of about 1700. The number following the HB indicates the viscosity SUS at 100° F.

The Ucon LB compounds are derived from butyl alcohol and 1,2-propylene oxide. Thus, Ucon LB 1145 is the monobutyl ether of a polyoxypropylene glycol having a viscosity at 100° F. of 1145 SUS. This composition has a molecular weight of approximately 1700.

The Ucon HTD compounds are similar to the HB compounds except that they are derived from dodecyl alcohol instead of butyl alcohol.

The Ucon HM compounds are similar to the HB compounds except that they are derived from methyl alcohol instead of butyl alcohol.

The Ucon HBA compounds are addition products of ethylene oxide and 1,2-propylene oxide with butylamine.

The Ucon HDBA compounds are addition products of ethylene oxide and 1,2-propylene oxide with dibutylamine. The number in front of the HDBA indicates the percentage of ethylene oxide, the remainder being 1,2-propylene oxide. The last number indicates the viscosity SUS at 100° F.

The demulsifying compositions of the present invention are preferably employed in the proportion of one part of demulsifying agent to from 10,000 to 100,000 parts of emulsion either by adding the concentrated product directly to the emulsion or diluting with a vehicle in the customary manner.

Among the suitable hydrocarbon vehicles which can be employed as diluents is sulfur dioxide (SO₂) extract. This material is a by-product from the Edeleanu process of refining petroleum in which the undesirable fractions are removed by extraction with liquid sulfur dioxide. After removal of the sulfur dioxide a mixture of hydrocarbons, substantially aromatic in character, remains which is designated in the trade as SO₂ extract. Examples of other suitable hydrocarbon vehicles are Gray Tower polymers, toluene, xylene, gas oil, diesel fuel, bunker fuel and coal tar solvents. The above cited examples of solvents are adaptable to azeotropic distillation as would also be any other solvent which is immiscible with water, miscible with the reacting mass and has a boiling point or boiling range in excess of the boiling point of water.

The products prepared in accordance with the invention are very useful in breaking petroleum emulsions, especially those in which the oil is paraffinic or paraffinic-naphthenic, and are suitable for use in breaking water-in-oil petroleum emulsions in the Mid-continent oil fields, including Oklahoma, Illinois, Kansas, the Gulf coast, Louisiana, Southwest Texas and California.

The term "an oxymethylene group" unless modified by the words "unsubstituted" or "substituted" is intended to cover generically the group

where A and B may be hydrogen or carbon radicals, e.g., alkyl or aryl radicals. An unsubstituted oxymethylene group is one in which both A and B are hydrogen atoms. A substituted methylene group is one in which A or B or both is a carbon radical in which a carbon atom is linked to the main methylene group.

The invention is hereby claimed as follows:

1. A process of breaking water-in-oil emulsions which comprises treating such emulsions with an addition product of a compound from the group consisting of aldehydes and ketones and an aliphatic hydroxy compound containing a primary hydroxyl group, said addition product being further characterized by having a structure containing at least one interiorly located oxymethylene group to which is linearly attached at least one larger polyoxyalkylene chain and at least one aliphatic chain from the group consisting of aliphatic hydrocarbon chains, aliphatic oxyhydrocarbon chains, N-hydrocarbon chains and mixtures of said chains in the same molecule, with the further proviso that the average molecular weight attributable to oxyalkylene groups in said addition product is at least 1000 and the combined weight of oxyalkylene groups from the class consisting of oxymethylene and oxyethylene does not exceed the combined weight of the remainder of the molecule by a weight ratio greater than 4:1.

2. A process of breaking water-in-oil emulsions which comprises treating such emulsions with an addition product of a compound from the group consisting of aldehydes and ketones and an aliphatic hydroxy compound containing a primary hydroxyl group, said addition product being further characterized by having a structure containing at least one interiorly located oxymethylene group to which is linearly attached at least one larger polyoxyalkylene chain and at least one aliphatic chain from the group consisting of aliphatic hydrocarbon chains, aliphatic oxyhydrocarbon chains, N-hydrocarbon chains and mixtures of said chains in the same molecule, with the further proviso that the average molecular weight attributable to oxyalkylene groups in said addition product is at least 1000, the combined weight of oxyalkylene groups from the class consisting of oxymethylene and oxyethylene does not exceed the combined weight of the remainder of the molecule by a weight ratio greater than 4:1, and the total average molecular weight of said addition product does not exceed 20,000.

3. A process of breaking water-in-oil emulsions which comprises treating such emulsions with an addition product of formaldehyde and an aliphatic hydroxy compound containing a primary hydroxyl group, said addition product being further characterized by having a structure containing at least one interiorly located oxymethylene group to which is linearly attached at least one larger polyoxyalkylene chain and at least one aliphatic chain from the group consisting of aliphatic hydrocarbon chains, aliphatic oxyhydrocarbon chains, N-hydrocarbon chains and mixtures of said chains in the same molecule, with the further proviso that the average molecular weight attributable to oxyalkylene groups in said addition product is at least 1000 and the combined weight of oxyalkylene groups from the class consisting of oxymethylene and oxyethylene does not exceed the combined weight of the remainder of the molecule by a weight ratio greater than 4:1.

4. A process as claimed in claim 3 in which said addition product is a diol.

5. A process as claimed in claim 3 in which said addition product is an ester of a diol.

6. A process as claimed in claim 3 in which said addition product is an ether of a diol.

7. A process as claimed in claim 3 in which said addition product is an amine addition product of a diol.

8. A process of breaking water-in-oil emulsions which comprises treating such emulsions with an addition product of formaldehyde and a polyoxyalkylene aliphatic hydroxy compound containing a primary hydroxyl group, said addition product being further characterized by having a structure containing at least one interiorly located oxymethylene group to which is linearly attached at least one larger polyoxyalkylene chain and at least one aliphatic chain containing oxypropylene groups, with the further proviso that the average molecular weight attributable to oxyalkylene groups in said addition product is at least 1000, the combined weight ratio of oxyalkylene groups from the class consisting of oxymethylene and oxyethylene to the combined weight of higher oxyalkylene groups is within the range of 4:1 to 1:9, and the average molecular weight of said addition product does not exceed 20,000.

9. A process of breaking water-in-oil petroleum emulsions which comprises treating such emulsions with an addition product of formaldehyde and a polyoxypropylene glycol, the average molecular weight attributable to oxyalkylene groups in said addition product being at least 1000.

10. A process of breaking water-in-oil petroleum emulsions which comprises treating such emulsions with an addition product of formaldehyde, a polyoxyethylene glycol and a polyoxypropylene glycol, the average molecular weight attributable to oxyalkylene groups in said addition product being at least 1000, the combined weight ratio of oxyalkylene groups from the class consisting of oxymethylene and oxyethylene to the combined weight of oxypropylene groups being within the range of 4:1 to 1:9 and the average molecular weight of said addition product not exceeding 20,000.

References Cited in the file of this patent

UNITED STATES PATENTS

| | | |
|---|---|---|
| 2,330,474 | De Groote | Sept. 28, 1943 |
| 2,375,537 | De Groote | May 8, 1945 |
| 2,403,343 | De Groote | July 2, 1946 |